United States Patent [19]

Williamson

[11] Patent Number: 5,774,458

[45] Date of Patent: Jun. 30, 1998

[54] MULTIPLEX AMPLIFIERS FOR TWO-WAY COMMUNICATIONS IN A FULL-SERVICE NETWORK

[75] Inventor: Louis D. Williamson, Denver, Colo.

[73] Assignee: Time Warner Cable, Stamford, Conn.

[21] Appl. No.: 572,141

[22] Filed: Dec. 14, 1995

[51] Int. Cl.$^6$ ................................ H04B 1/56; H04L 5/14
[52] U.S. Cl. ........................................... 370/276; 370/281
[58] Field of Search ................................... 370/276, 279, 370/281, 485, 486, 487, 395; 348/6, 7, 8, 11, 12

[56] References Cited

U.S. PATENT DOCUMENTS

| | | |
|---|---|---|
| 3,956,717 | 5/1976 | Fisher et al. . |
| 4,214,316 | 7/1980 | Lipsky . |
| 4,506,387 | 3/1985 | Walter . |
| 4,530,008 | 7/1985 | McVoy . |
| 4,553,161 | 11/1985 | Citta . |
| 4,592,546 | 6/1986 | Fascenda et al. . |
| 4,823,386 | 4/1989 | Dumbauld et al. . |
| 4,991,208 | 2/1991 | Walker et al. . |
| 5,046,090 | 9/1991 | Walker et al. . |
| 5,093,718 | 3/1992 | Hoarty et al. . |
| 5,168,353 | 12/1992 | Walker et al. . |
| 5,220,420 | 6/1993 | Hoarty et al. . |
| 5,225,267 | 7/1993 | Hansen et al. . |
| 5,231,629 | 7/1993 | Kotzin et al. ........................... 370/279 |
| 5,311,423 | 5/1994 | Clark . |
| 5,327,580 | 7/1994 | Vignali et al. ........................... 370/379 |
| 5,343,239 | 8/1994 | Lappington et al. . |
| 5,357,276 | 10/1994 | Banker et al. . |
| 5,361,091 | 11/1994 | Hoarty et al. . |

(List continued on next page.)

OTHER PUBLICATIONS

Adams, Michael, "Network Design and Implementation of a large-scale, ATM, Multimedia Network," *Engineer Conference Notes* from NETWORLD$^{SM}$+INTEROP® 95, Las Vegas, NV, (Mar. 27–31, 1995).

Adams, Michael, "Real Time MPEG Asset Delivery over ATM," *NCTA Technical Papers, 1995*:315–326 (1995).

News Release, "Time Warner Introduces World's First Full Service Network in Orlando," TimeWarner Cable Full Service Network, Maitland, FL, 32751 (Dec. 14, 1994).

Product Information Package from Wink Communications, 2061 Challenger Drive, Alameda, CA 94501 (1995).

Request for Proposals, "Development of a Full Service Network: A request by Time Warner for assistance in building a full service telecommunications network" (Feb. 11, 1993), Time Warner Cable, Denver, CO.

Vecchi, Mario P., and Adams, Michael, "Traffic Management for Highly Interactive Transactional System," *NCTA Technical Papers, 1995*:258–266 (1995).

*Primary Examiner*—Douglas W. Olms
*Assistant Examiner*—Ajit Patel
*Attorney, Agent, or Firm*—Homer L. Knearl; Holland & Hart llp

[57] ABSTRACT

The present invention is a novel apparatus for amplifying upstream and downstream signals, the signals comprising different portions of a communications spectrum and wherein at least two portions require amplification in opposing upstream and downstream directions. The apparatus comprises: an upstream port wherein upstream signals are input into the apparatus; a downstream port wherein downstream signals are input into the apparatus; a first stage connected to the upstream and the downstream ports, the first stage filtering out a first portion of the spectrum and passing the first portion between the upstream and downstream ports, the first stage comprising a first pair of first stage filters for filtering the first portion from the upstream and the downstream signals and a second pair of first stage filters for passing the remaining spectrum; a second stage connected to the second pair of first stage filters, the second stage filtering out a second and a third portion from the remaining spectrum; the second stage comprising a first pair of second stage filters for filtering the second portion and a second pair of second stage filters for filtering the third portion; wherein the first stage and the second stage are substantially electrically isolated.

13 Claims, 7 Drawing Sheets

U.S. PATENT DOCUMENTS

| | | |
|---|---|---|
| 5,383,112 | 1/1995 | Clark . |
| 5,390,337 | 2/1995 | Jelinek et al. . |
| 5,394,394 | 2/1995 | Crowther et al. . |
| 5,400,402 | 3/1995 | Garfinkle . |
| 5,412,720 | 5/1995 | Hoarty . |
| 5,421,031 | 5/1995 | De Bey . |
| 5,422,674 | 6/1995 | Hooper et al. . |
| 5,423,555 | 6/1995 | Kidrin . |
| 5,425,027 | 6/1995 | Baran . |
| 5,426,699 | 6/1995 | Wunderlich et al. . |
| 5,442,700 | 8/1995 | Snell et al. . |
| 5,446,726 | 8/1995 | Rostoker et al. . |
| 5,452,297 | 9/1995 | Hiller et al. . |
| 5,453,979 | 9/1995 | Schibler et al. . |
| 5,455,701 | 10/1995 | Eng et al. . |
| 5,455,820 | 10/1995 | Yamada . |
| 5,455,825 | 10/1995 | Lauer et al. . |
| 5,459,722 | 10/1995 | Sherif . |

MULTIPLEX AMPLIFIERS FOR TWO-WAY COMMUNICATIONS IN A FULL-SERVICE NETWORK

FIELD OF THE INVENTION

The present invention relates in general to an apparatus and a method of facilitating two-way communications in a full-service network and, in particular, to an apparatus for amplifying two-way communications that employs a full-band spectrum for forward and reverse data streams.

BACKGROUND OF THE INVENTION

One of the challenges faced by designers of "full-service" interactive networks is how to provide interactive services to their subscribers at the lowest possible cost. In a geographic area that is currently serviced by a traditional cable system, the idea has been to piggyback any additional infrastructure needed to support interactive services directly onto the existing cable plant. By utilizing the existing cable system, cost savings may be realized by the attendant reduction in laying of cable to individual homes.

The marriage of traditional cable with the demands of fully interactive services, however, is not without its problems. These problems arise primarily because the needs of interactive services differ from the needs of traditional cable. Interactive networks are characterized by the two-way communications that occur between subscribers and a central service center (often called a "head end") or between subscribers themselves. Typically, a subscriber makes a request (e.g. through a set-top processor) for service to the head end. In response, the head end processes the request, which usually comprises routing data and instructions to the requesting subscriber.

Full-service, interactive networks differ from traditional cable systems in the nature of this two-way communications that takes place between subscriber and head end. A typical cable network has very asymmetric traffic—e.g. much more traffic occurs from head end to subscriber (i.e. "forward" or "downstream" direction) than occurs from the subscriber to the head end (i.e. "reverse" or "upstream" direction). As networks and their services become more interactive, the communications, while still asymmetric, are less so. Therefore, more bandwidth is required for reverse channels than are currently used by typical cable systems.

Currently, cable systems use the 5–40 MHz band for reverse channel communications. To provide the additional bandwidth for reverse channel communication in a full-service network, some other portion of the given spectrum could be allocated for such reverse channels communications. For example, a high end band (e.g. 900-1 GHz) could be provided for such reverse channel. This would add an additional 100+MHz of bandwidth to the existing 35 MHz bandwidth for reverse channel communications.

In order to add the additional reverse channel bandwidth, the plant infrastructure must support the transmission of such channels. Such support entails the periodic amplification of signals along the cable to overcome the effects of attenuation. Because there may be several forward and reverse channels operating in the spectrum, it would be necessary to filter out the various forward and reverse channels and amplify them in their respective directions. After amplification, the various bands would then be multiplexed onto the cable for further transmission.

Problems occur, however, when several bands are filtered and amplified in close proximity. First, if all the various bands are multiplexed onto the cable at the same point, undesirable loop gain may occur. Second, with the close proximity of these amplifiers, shielding the signals in the bands from each other becomes desirable to avoid cross-talk.

Thus, there is a need for an apparatus and method for providing signal amplification of the various bands where different bands are possibly assigned different communication directions while minimizing the effects of loop gain and crosstalk.

It is therefore an object of the present invention to provide an apparatus and a method for filtering and amplifying the bands running in multiple directions while minimizing the effects of loop gain and crosstalk.

SUMMARY OF THE INVENTION

Other features and advantages of the present invention will be apparent from the following description of the preferred embodiments, and from the claims.

The present invention is a novel apparatus for providing filtering and amplification of signals over a communication spectrum. The communication spectrum is divided into at least three bands and where at least two such bands are assigned a different communication direction.

One embodiment of the present invention comprises an apparatus for amplifying upstream and downstream signals, said signals comprising at least three different portions of a communications spectrum and wherein at least two said portions require amplification in opposing upstream and downstream directions; said apparatus comprising:

an upstream port wherein upstream signals are input into said apparatus;

a downstream port wherein downstream signals are input into said apparatus;

a first stage connected to said upstream and said downstream ports, said first stage filtering out a first portion of said spectrum and passing said first portion between said upstream and downstream ports, said first stage comprising a first pair of first stage filters for filtering said first portion from said upstream and said downstream signals and a second pair of first stage filters for passing the remaining spectrum;

a second stage connected to said second pair of first stage filters, said second stage filtering out a second and a third portion from said remaining spectrum; said second stage comprising a first pair of second stage filters for filtering said second portion and a second pair of second stage filters for filtering said third portion;

wherein said first stage and said second stage are substantially electrically isolated.

One advantage of the present invention is avoiding undesirable loop gain and crosstalk. By filtering and dividing the communication spectrum into at least three portions and amplifying a first portion in an electrically isolated manner from the other portions, the likelihood of crosstalk is reduced. Additionally, if the first portion is separately amplified in a different communications direction (e.g. upstream or downstream) than the second or third portions, then the likelihood of undesirable loop gain is reduced.

For a full understanding of the present invention, reference should now be made to the following detailed description of the preferred embodiments of the invention and to the accompanying drawings.

DETAILED DESCRIPTION OF THE INVENTION

Figure 1:
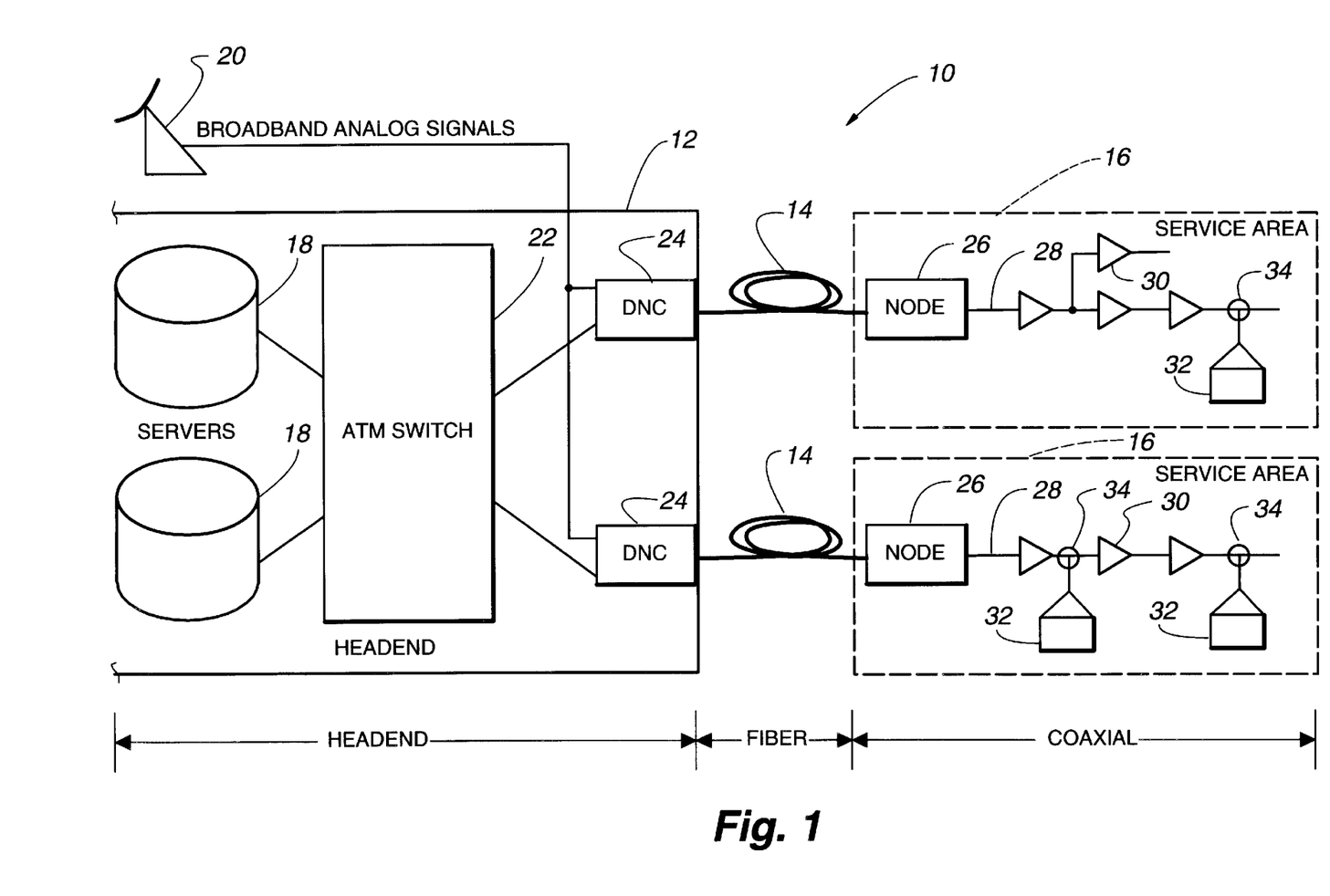
FIG. 1 is a high-level, block diagram of a full-service, interactive network that suffices for the purposes of the present invention.

As the present invention is directed to the filtering and amplification of digital and analog signals moving in both forward (i.e. downstream) and reverse (i.e. upstream) directions, any network delivering such signals will suffice for the purposes of the present invention. FIG. 1 is a high level block diagram of a full-service network that might suffice for the purposes of the present invention. Network 10 comprises head end 12 which provides the necessary computational and storage resources to handle a fairly large number of user requests. Fiber link 14 provides a high speed, very reliable communications link to the various neighborhood service areas 16.

Head end 12 further comprises a set of servers 18 that receive service requests from subscribers and supplies both digital data and programming to the subscribers in response. The digital signals from servers 18 are routed through ATM switch 22 to the appropriate digital node controller 24 which services the neighborhood for the requesting subscriber. Analog broadcast signals 20 are also received by head end 12, modulated by digital node controller 24, and transmitted along with the digital signals to the neighborhood service areas 16.

Network 10 is a generalized overview of a hybrid fiber/coaxial (HFC) network. A more detailed description of this type of network is disclosed in FIG. 2, found in commonly assigned U.S. patent application Ser. No. 08/572,521, entitled "A Method for Message Addressing in a Full Service Network", which is herein incorporated by reference. Although networks 10 and 40 are described generally, it will be appreciated that many different types and topologies of networks would suffice for the purposes of the present invention. Thus, the scope of the present invention should not be limited to any particular network embodiment.

An important feature of a full-service network is that there is a forward and reverse flow of data and instructions between the head end and the subscribers' set top processors. Additionally, the full-service network typically enables communications via a frequency divided spectrum, such as the radio frequency (RF) spectrum. This spectrum is divided into 'portions', where each portion is possibly dedicated to a given direction for communication (e.g. upstream or downstream). Although the current embodiments describe portions selected out of the RF spectrum, it will be appreciated that any suitable communication spectrum suffices for the purposes of the present invention. For the purposes of the present invention, it suffices that any two portions are amplified in opposing directions so that loop gain might occur.

Figure 2:
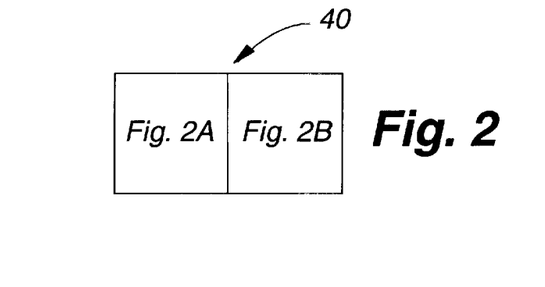
FIG. 2 is another, more detailed, embodiment of a full-service network (FSN) such as depicted in FIG. 1.
Figure 2A:
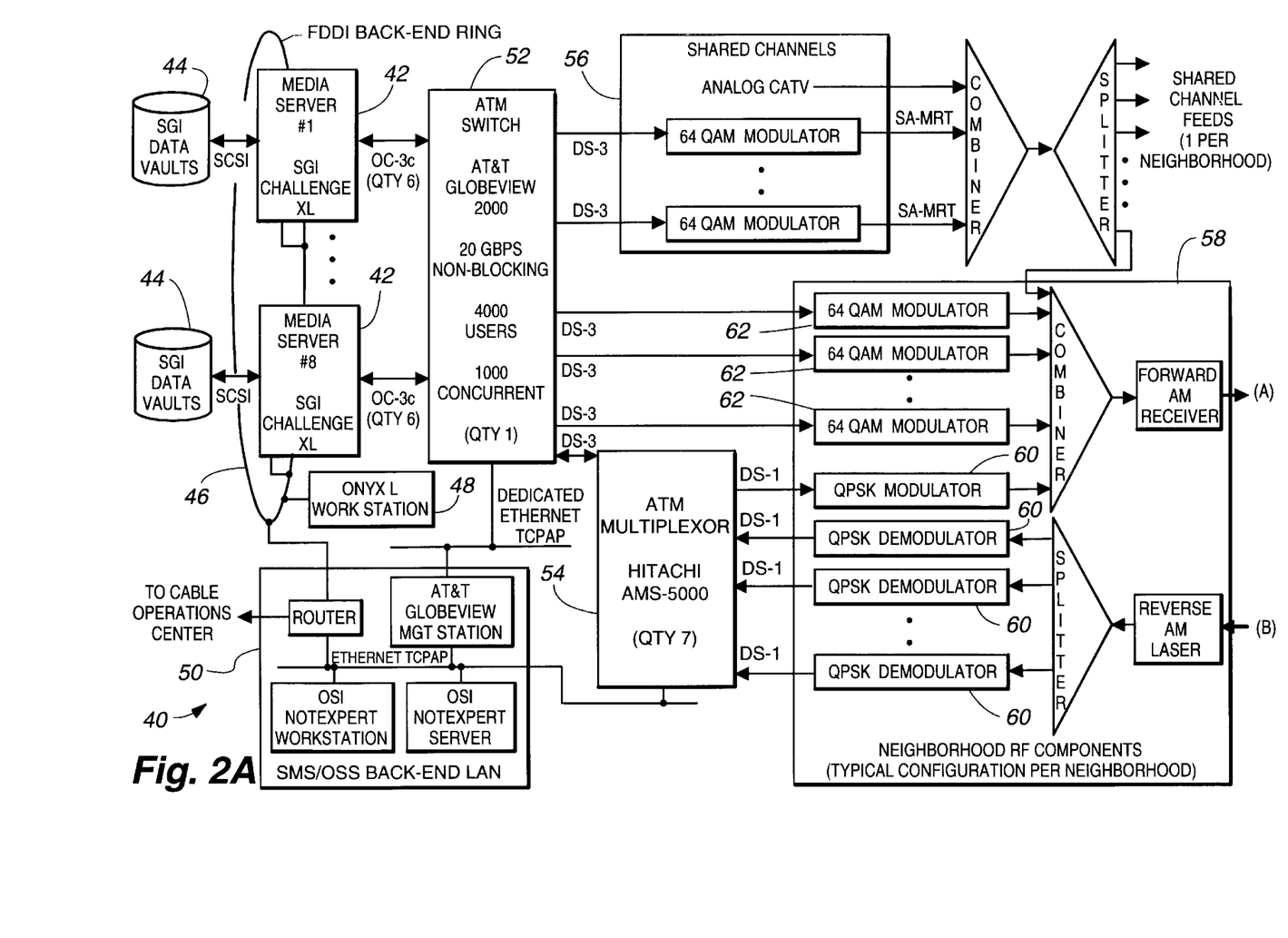
Figure 2B:
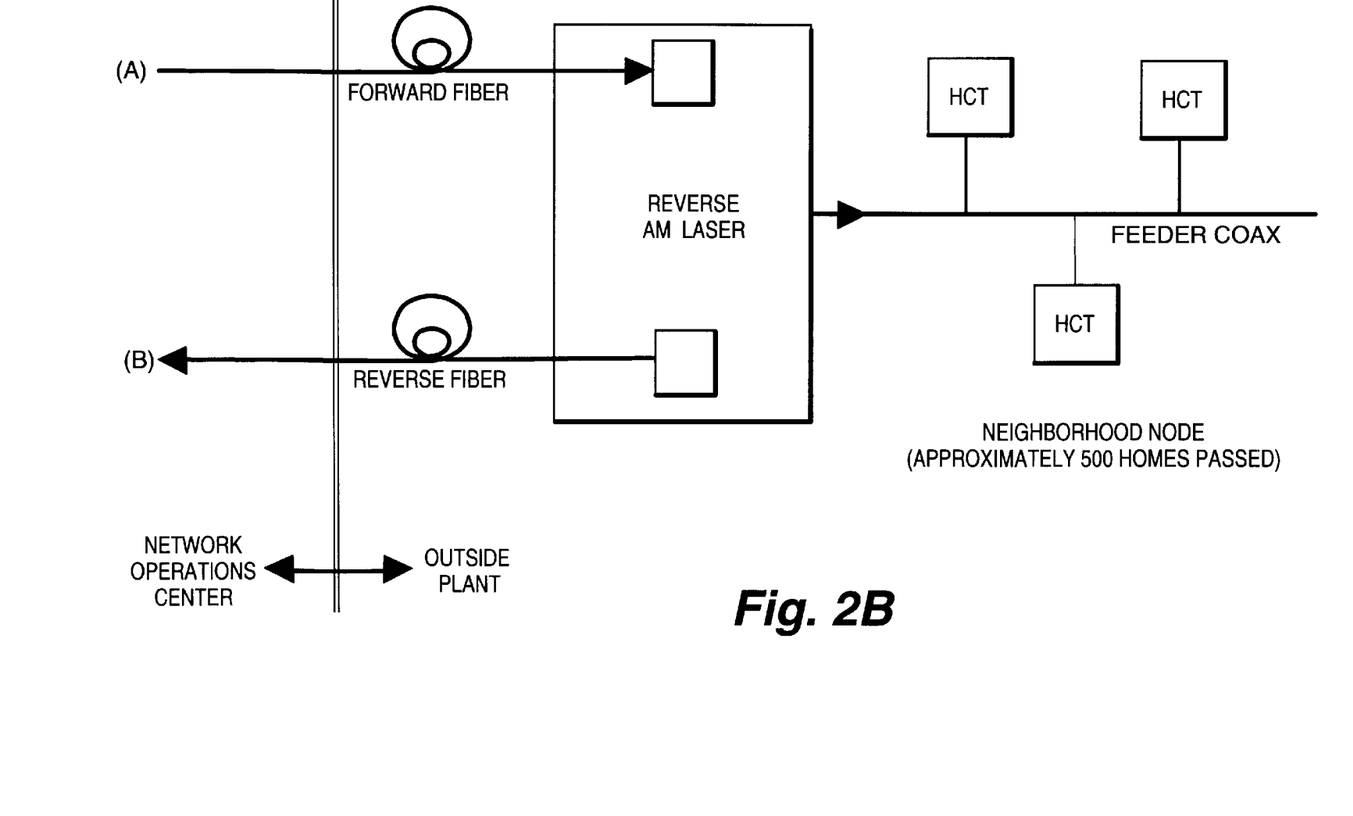
Figure 3:
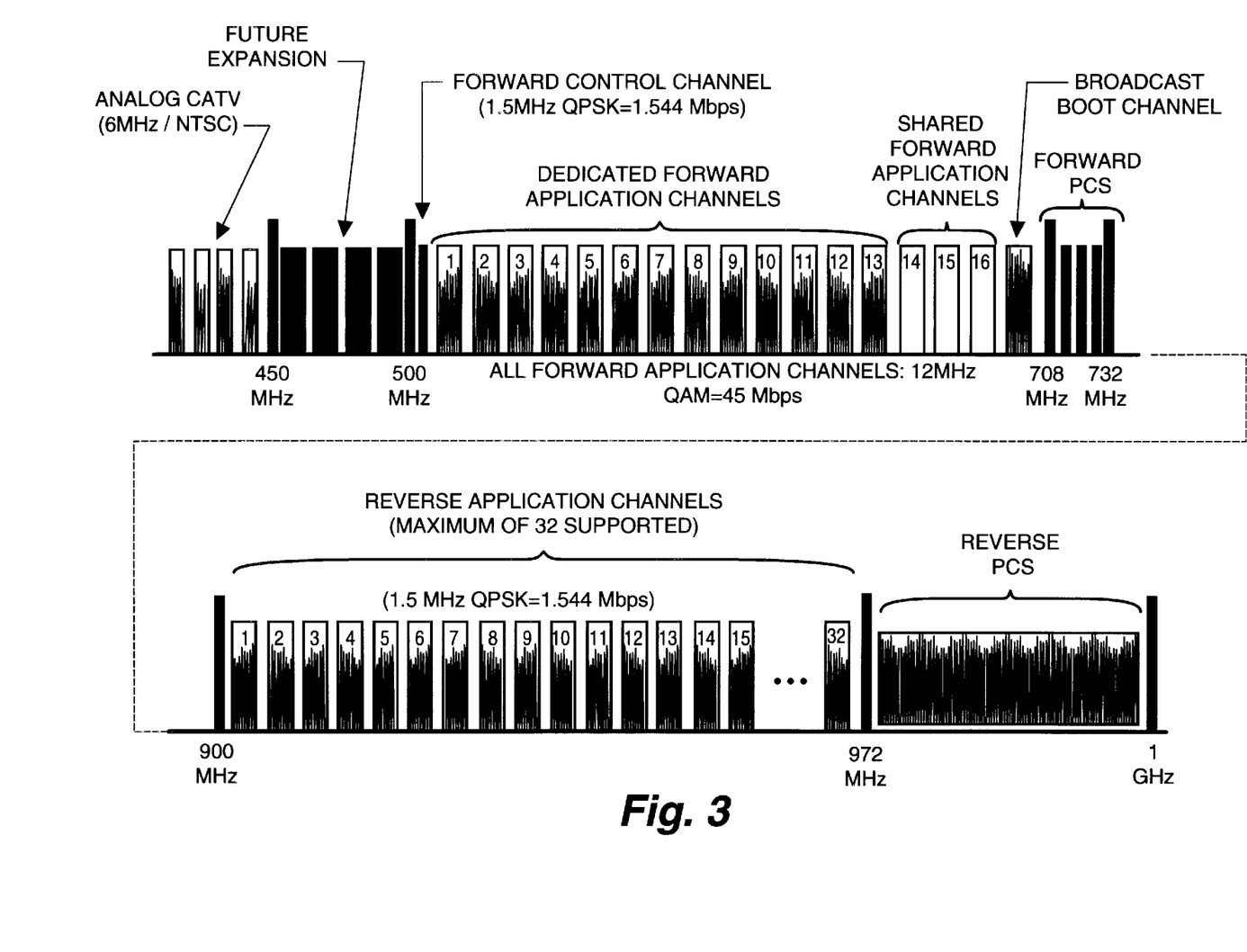
FIG. 3 is a diagram of a spectrum allocation scheme to enable communications within a full-service network.

FIG. 3 shows a particular implementation of a communications scheme to facilitate the transmission of subscribers' requests and services. FIG. 3 shows a radio frequency (RF) spectrum allocation scheme that could be implemented on networks 10 or 40. These networks divide groups of subscribers into neighborhood nodes and each node is directly connected to the head end. Thus, each such node has a unique RF spectrum. Although the channels are divided uniformly among all RF spectrums, each node contains unique digital signals. As seen in FIG. 2, the spectrum is allocated to support analog cable television services (CATV), interactive digital services, and personal communication services (PCS).

Traditionally, cable providers utilize frequencies between 50 MHz and 500 MHz to supply analog CATV services to subscribers. Thus, these networks pass these same signals at the same RF spectrum. The spectrum above 500 MHz is allocated for interactive digital services and PCS. In order to provide interactive digital services, bi-directional communications paths are required. In the forward direction, the spectrum includes forward control channels (FCCs) and forward application channels (FACs).

In order to provide control information to the set-top processors in a particular node, each node contains a unique forward control channel. This channel is a relatively small bandwidth channel (1.5. Mbps) which is used to provide boot, security, and synchronization information to all subscribers in a specific node. In addition to the forward control channel, each node contains multiple forward application channels. These forward application channels are high bandwidth channels (45 Mbps) which are used to deliver data and video to a small group of six to seven users. As shown in FIG. 3, each node contains both dedicated and shared channels. The dedicated channels are used to provide interactive services to subscribers in specific nodes. The shared channels provide a common signal to all nodes. These channels are included to provide overflow capacity for nodes with large demands and "broadcast-like" functionality. Each node also contains reverse application and PCS channels. The reverse channels are shared by multiple users using a non-contention based, time division multiple access (TDMA) scheme. It will be appreciated that, for the purposes of the present invention, it suffices that there is communications spectrum that is divided into frequency portions such that at least two of the portions are dedicated to communications in opposing directions (i.e. upstream or downstream).

Figure 4:
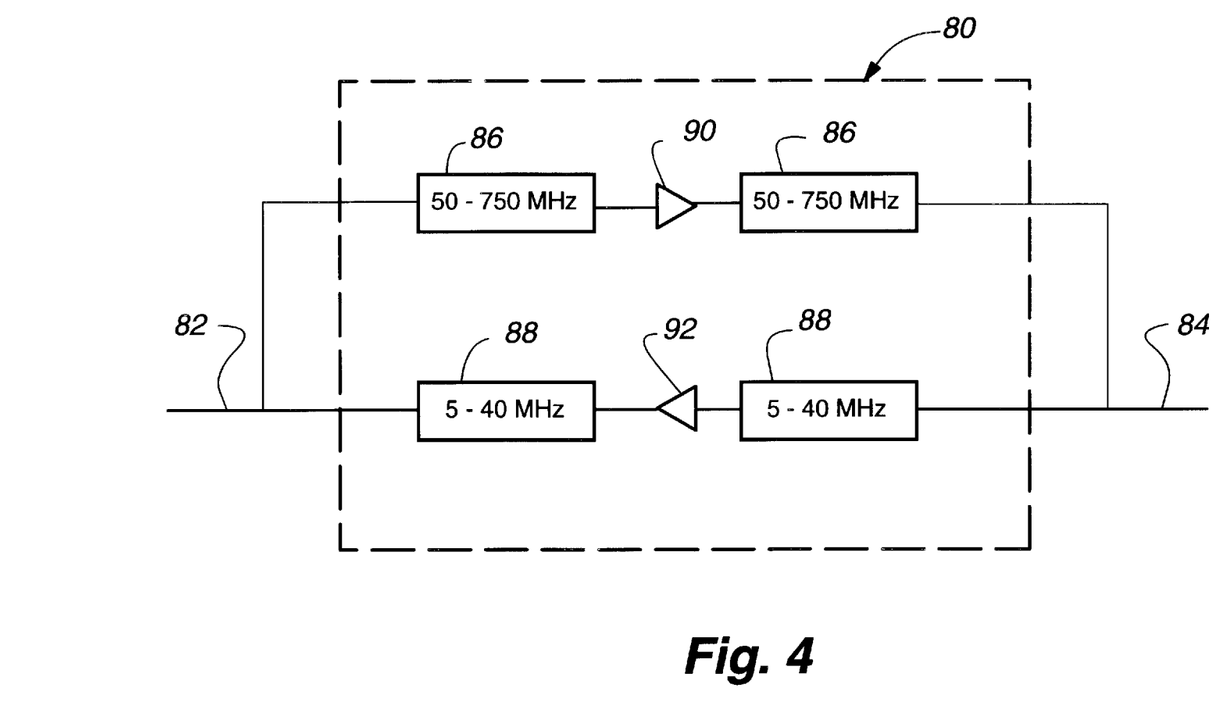
FIG. 4 is a conventional diplex amplifier that separates the communication spectrum into two portions and separately amplifies each portion.

Having described one particular communication scheme for a full-service network, an apparatus will now be described for amplifying signal portion along a feeder cable. FIG. 4 shows a conventional diplex amplifier 80 that separates the communication spectrum into two portions and separately amplifies each portion. Diplex amplifier 80 comprises an upstream port 82, a downstream port 84, a pair of high-end portion filters 86, a pair of low-end portion filters 88, and amplifiers 90 and 92. As shown, the high-end portion of the RF spectrum (50–750 MHz) is dedicated to communications in the upstream direction, thus amplifier 90 amplifies the signal in that direction. Similarly, amplifier 92 amplifies the signal in the downstream direction.

As the high-end and the low-end portions share common nodes 82 and 84, there is a slight possibility of undesirable loop gain. This possibility increases if filters 86 and 88 inadvertently pass frequencies outside their ratings. Additionally, the possibility of crosstalk increases if there is no effective shielding between the upstream and downstream signal paths.

Figure 5:
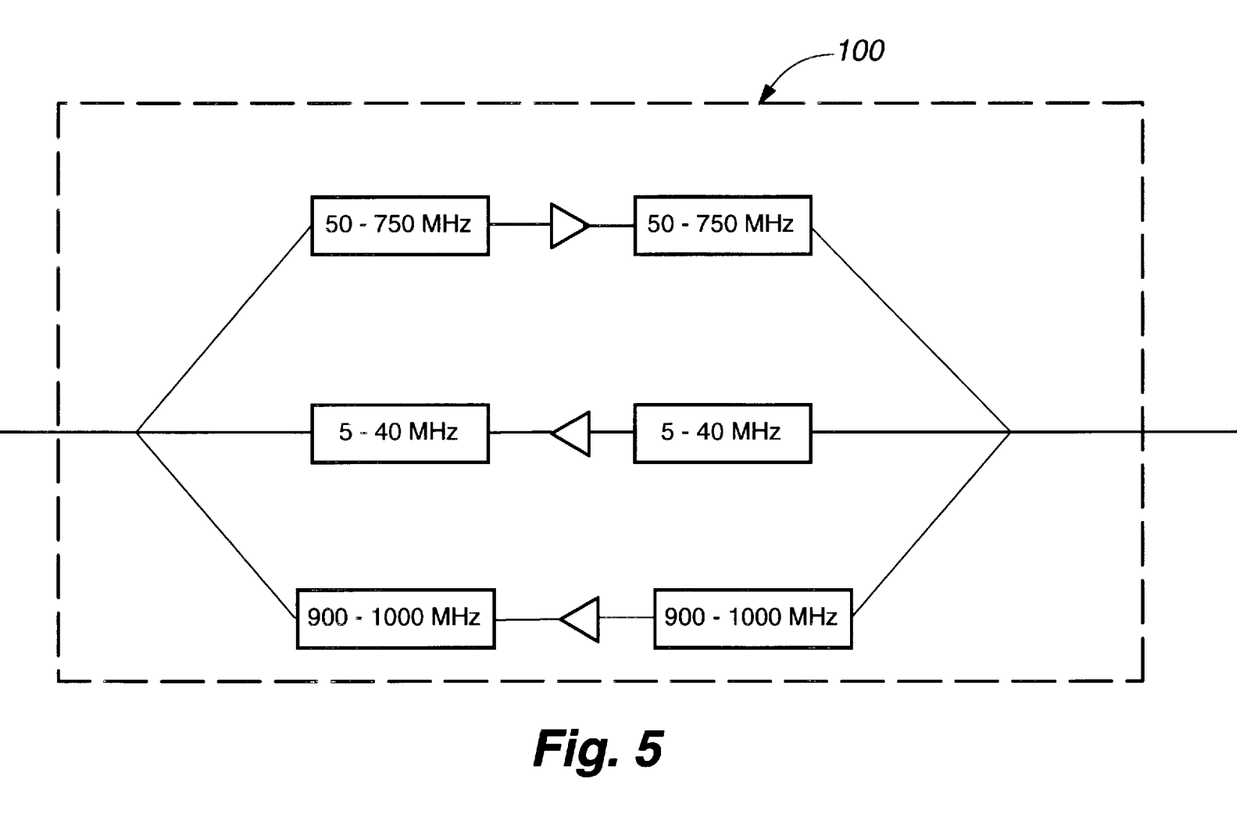
FIG. 5 is a triplex amplifier design that might suffer from undesirable loop gain and crosstalk.

The problems of loop gain and crosstalk become exacerbated as the number of portions needing amplification increase. FIG. 5 shows a triplex amplifier design 100 where these problems might occur. As seen in FIG. 5, the communications spectrum is divided into three portion (high, mid and low end), where at least two portions need amplification in opposing directions. As this amplifier is designed for a single housing, it becomes more difficult to shield the different signal paths from each other. Therefore, crosstalk becomes more of a concern that in the diplex amplifier.

Additionally, the possibility of undesirable loop gain increase with the number of possible loops in the circuit.

Figure 6:
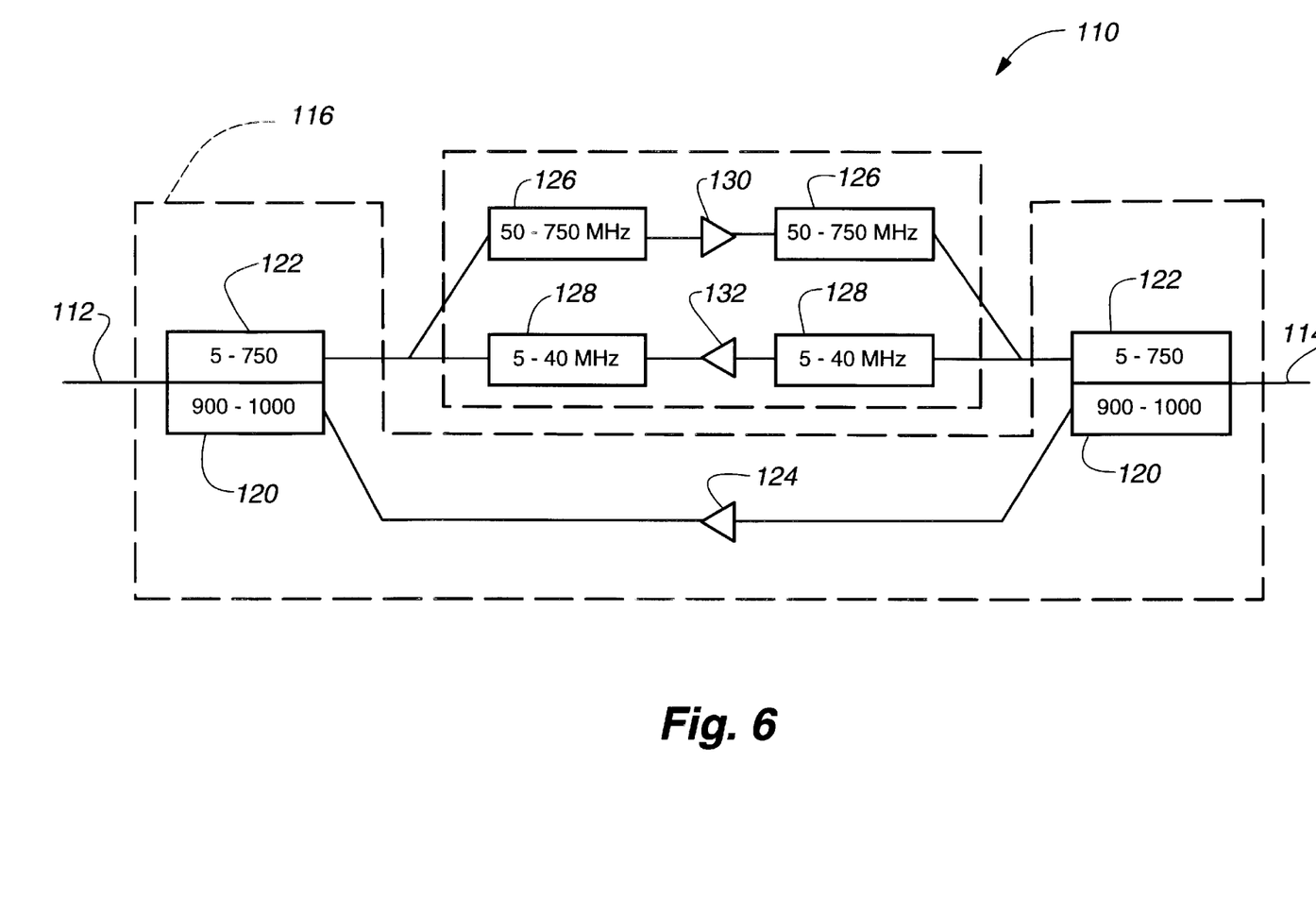
FIG. 6 is a triplex amplifier design made in accordance with the principles of the present invention.

To alleviate these problems, the idea of the present invention is to split the multiplex amplifier into stages and electrically isolate the stages. For example, FIG. 6 shows a triplex amplifier design 110 made in accordance with the principles of the present invention. Triplex amplifier comprises an upstream port 112, a downstream port 114, a first stage 116, and a second stage 118. First stage 116 comprises a pair of high end filters 120 and a pair of filters 122 for passing the remaining spectrum signals to the second stage 118.

Between filters 120 is an amplifier 124 to amplify the high end portion of the communications spectrum. This amplifier (like the rest of the first stage) is amply shielded from interfering signals from the second stage and vice-a-versa. It should be appreciated that such shielding techniques are well known to those skilled in the art and that the present invention should not be limited to the employ of any one such technique. Moreover, if the shielding is sufficient for the given components and operating parameters of the triplex amplifier, then it is possible to house both the first and the second stage together.

Second stage 118 accepts the remaining spectrum from first stage 116 in both the upstream and downstream communications directions. Second stage comprises a pair of mid range filters 126, a pair of low end filters 128, amplifier 130 disposed between filters 126, and amplifier 132 disposed between filters 128. As noted above, since the problems with a diplex amplifier are less than might occur with a triplex amplifier, the potential loop gain and crosstalk presented by second stage 118 is more manageable.

Although the embodiment of FIG. 6 discloses only a triplex amplifier design, it will be appreciated that the principles of the present invention apply with equal force to a multiplex or m-plex amplifier (with 'm' greater than 3). Thus, the scope of the present invention should not be limited unnecessarily to only triplex amplifiers.

There has thus been shown and described a novel apparatus for amplifying multiple portions of a communication spectrum while avoiding the problems of loop gain and crosstalk in a network which meets the objects and advantages sought. As stated above, many changes, modifications, variations and other uses and applications of the subject invention will, however, become apparent to those skilled in the art after considering this specification and accompanying drawings which disclose preferred embodiments thereof. All such changes, modifications, variations and other uses and applications which do not depart from the spirit and scope of the invention are deemed to be covered by the invention which is limited only by the claims which follow.

I claim:

1. An apparatus for amplifying upstream and downstream signals, said signals comprising at least three different portions of a communications spectrum and wherein at least two said portions require amplification in opposing upstream and downstream directions; said apparatus comprising:

an upstream port wherein upstream signals are input into said apparatus;

a downstream port wherein downstream signals are input into said apparatus;

a first stage connected to said upstream and said downstream ports, said first stage filtering out a first portion of said spectrum and passing said first portion between said upstream and downstream ports, said first stage comprising a first pair of first stage filters for filtering said first portion from said upstream and said downstream signals and a second pair of first stage filters for passing the remaining spectrum;

a second stage connected to said second pair of first stage filters, said second stage filtering out a second and a third portion from said remaining spectrum; said second stage comprising a first pair of second stage filters for filtering said second portion and a second pair of second stage filters for filtering said third portion;

wherein said first stage and said second stage are electrically isolated.

2. The apparatus of claim 1 wherein said communication spectrum is the radio frequency spectrum, said first portion is high-end portion of the radio frequency spectrum, said second portion is the mid-range portion of the radio frequency spectrum, and said third portion is the low-end portion of the radio frequency spectrum.

3. The apparatus of claim 1 wherein said first stage further comprises a first amplifier for amplifying said first portion passing between said first pair of first stage filters.

4. The apparatus of claim 1 wherein said second stage further comprises a second amplifier for amplifying said second portion passing between said first pair of second stage filters.

5. The apparatus of claim 1 wherein said second stage further comprises a third amplifier for amplifying said third portion passing between said second pair of second stage filters.

6. The apparatus of claim 1 wherein said first stage further comprises a first amplifier for amplifying said first portion passing between said first pair of first stage filters; and wherein said second stage further comprises a second amplifier for amplifying said second portion passing between said first pair of second stage filters.

7. The apparatus of claim 1 wherein said first stage further comprises a first amplifier for amplifying said first portion passing between said first pair of first stage filters; and wherein said second stage further comprises a third amplifier for amplifying said third portion passing between said second pair of second stage filters.

8. The apparatus of claim 1 wherein said first stage further comprises a first amplifier for amplifying said first portion passing between said first pair of first stage filters; and wherein said second stage further comprises a second amplifier for amplifying said second portion passing between said first pair of second stage filters; and wherein said second stage further comprises a third amplifier for amplifying said third portion passing between said second pair of second stage filters.

9. The apparatus of claims 6, 7, or 8 wherein said first portion is electrically isolated from said second portion.

10. The apparatus of claims 6, 7, or 8 wherein said first portion is electrically isolated from said third portion.

11. The apparatus of claims 6, 7, or 8 wherein said first portion is electrically isolated from said second and said third portion.

12. The apparatus of claim 6, 7, or 8 wherein said first portion is amplified in a communications direction different from said second portion.

13. The apparatus of claim 6, 7, or 8 wherein said first portion is amplified in a communications direction different from said third portion.

* * * * *